United States Patent
Janeiro et al.

(10) Patent No.: US 11,773,289 B2
(45) Date of Patent: Oct. 3, 2023

(54) ORGANOFUNCTIONAL SILOXANES, PROCESS FOR PREPARING SAME AND THEIR USE FOR THE TREATMENT OF FILLINGS AND SURFACES

(71) Applicant: ABCR LABORATORIOS, S.L., Forcarei (ES)

(72) Inventors: Benigno Janeiro, Forcarei (ES); Luis Angel Adrio Castineira, Forcarei (ES); Jose Manuel Antelo Miguez, Forcarei (ES); Pablo Barreiro Gonzalez, Forcarei (ES)

(73) Assignee: ABCR LABORATORIOS, S.L., Forcarei (ES)

( * ) Notice: Subject to any disclaimer, the term of this patent is extended or adjusted under 35 U.S.C. 154(b) by 484 days.

(21) Appl. No.: 16/958,994

(22) PCT Filed: Feb. 7, 2019

(86) PCT No.: PCT/ES2019/070065
§ 371 (c)(1),
(2) Date: Jun. 29, 2020

(87) PCT Pub. No.: WO2019/180285
PCT Pub. Date: Sep. 26, 2019

(65) Prior Publication Data
US 2020/0332149 A1    Oct. 22, 2020

(30) Foreign Application Priority Data
Mar. 19, 2018 (EP) .................................. 18382183

(51) Int. Cl.
*C09C 1/28* (2006.01)
*C09D 183/08* (2006.01)
(Continued)

(52) U.S. Cl.
CPC .......... *C09D 183/08* (2013.01); *B01J 27/125* (2013.01); *B01J 27/128* (2013.01); *B01J 31/08* (2013.01);
(Continued)

(58) Field of Classification Search
CPC ...... C08K 5/548; C08G 77/28; C09D 183/08; C09C 1/3081
See application file for complete search history.

(56) References Cited

U.S. PATENT DOCUMENTS 3,876,605 A * 4/1975 Itoh .......................... C08K 9/06
   524/588
5,194,649 A   3/1993 Okawa
(Continued)

FOREIGN PATENT DOCUMENTS

CN    102786689 A    11/2012
EP    0499233 A2    8/1992
(Continued)

OTHER PUBLICATIONS

Matinlinna et al., "Silane adhesion mechanism in dental applications and surface treatments: A review", Dental Materials, 2018, vol. 34, pp. 13-28.
(Continued)

*Primary Examiner* — Margaret G Moore
(74) *Attorney, Agent, or Firm* — LUCAS & MERCANTI, LLP

(57) ABSTRACT

The present invention provides organofunctional siloxane coupling agents, dipodal siloxanes, siloxane block copolymers and a specific method for preparing these organofunctional siloxanes through an addition reaction of hydrido alkoxysilane and organofunctional disiloxanes to an organocyclosiloxane with a catalyst. The addition reaction of the current invention does not result in polymerization and
(Continued)

therefore the novel siloxane couplings agents are free of cyclosiloxanes and polymeric siloxanes. This makes them apt for adhesives, coatings and sealant applications. The present invention also relates to the use of these organofunctional siloxane compounds for the treatment of fillers and surfaces.

1 Claim, 1 Drawing Sheet

(51) Int. Cl.
| | |
|---|---|
| B01J 27/125 | (2006.01) |
| B01J 27/128 | (2006.01) |
| B01J 31/08 | (2006.01) |
| B01J 31/30 | (2006.01) |
| C07F 7/18 | (2006.01) |
| C08G 77/442 | (2006.01) |
| C08G 77/46 | (2006.01) |
| C09C 1/30 | (2006.01) |
| C09D 183/12 | (2006.01) |
| C08G 77/00 | (2006.01) |

(52) U.S. Cl.
CPC .............. *B01J 31/30* (2013.01); *C07F 7/1804* (2013.01); *C08G 77/442* (2013.01); *C08G 77/46* (2013.01); *C09C 1/3081* (2013.01); *C09D 183/12* (2013.01); *C08G 77/70* (2013.01)

(56) References Cited

U.S. PATENT DOCUMENTS

| | | | |
|---|---|---|---|
| 5,686,641 A | * | 11/1997 | Okawa ................... C07F 7/0838 556/453 |
| 6,133,394 A | | 10/2000 | Furukawa et al. |
| 2009/0143543 A1 | | 6/2009 | Yamane et al. |
| 2009/0302280 A1 | | 12/2009 | Simone et al. |

FOREIGN PATENT DOCUMENTS

| | | |
|---|---|---|
| EP | 2186844 A1 | 5/2010 |
| EP | 2960286 A1 | 12/2015 |
| KR | 10-2016-0044878 A | 4/2016 |

OTHER PUBLICATIONS

International Search Report for Corresponding International Application No. PCT/ES2019/070065 (4 Pages) (Oct. 31, 2019).

Greber et al., "Oligomeric silicon compounds with functional groups. II. Preparation of polysiloxane hydrides and their addition to unsaturated compounds"., Makromolekulare Chemie, 1960, vol. 39, pp. 189-216.

Greber et al., "Oligomeric silicon compounds with functional groups. I. Allyl, vinyl and, (ethyleneoxido) siloxanes". Makromolekulare Chemie, 1960, vol. 39, pp. 167-188.

Fu et al., "Polypropylene-polysiloxane block copolymers via hydrosilylation of monovinylidene capped isotactic polypropylene", Polymer Preprints, Proceedings Published 2003 by the American Chemical Society, 2003, vol. 44, No. 1, pp. 1014-1015.

Fanelli et al., "Ar/HMDSO/O2 Fed Atmospheric Pressure DBDs: Thin Film Deposition and GC-MS Investigation of By-Products", Plasma Processes and Polymers, 2010, vol. 7, pp. 535-543.

Partial International Search Report for Corresponding International Application No. PCT/ES2019/070065 (7 Pages) (dated May 29, 2019).

* cited by examiner

ORGANOFUNCTIONAL SILOXANES, PROCESS FOR PREPARING SAME AND THEIR USE FOR THE TREATMENT OF FILLINGS AND SURFACES

CROSS REFERENCE TO RELATED APPLICATION

This Application is a 371 of PCT/ES2019/070065, filed Feb. 7, 2019, which claims the benefit of European Patent Application No. 18382183.4, filed Mar. 19, 2018, which is incorporated herein by reference.

FIELD OF THE INVENTION

The present invention relates to a method for preparing organofunctional siloxane coupling agents, dipodal siloxanes and siloxane block copolymers in high yields. Particularly, the present invention relates to a method for preparing organofunctional siloxanes by the addition reaction of hydrido alkoxysilanes and organofunctional disiloxanes to cyclosiloxanes. The invention is also related to the use of organofunctional siloxane compounds for the treatment of fillers and surfaces.

BACKGROUND ART

A silane that contains at least one carbon-silicon bond (Si—C) structure is known as an organosilane. A class of organosilanes with two reactive centers are known as silane coupling agents and are extensively used to couple organic materials to inorganic materials. Organosilane coupling agents are widely used commercially due to their remarkable versatility. They are hybrid molecules that combine the functionality of a reactive organic group and the silicon inorganic functionality into a single molecule.

The chemical structure for the most common type silane coupling agent is:

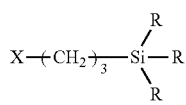

Where X is an organofunctional group that can be, for example, an amine, epoxy, or acrylate and R can be independently an alkyl or alkoxy group. The alkyl spacer, —(CH$_2$)$_3$—, between the organic group, X, and the silicon atom provides a unique property which is used as a molecular bridge to make inorganic materials organically compatible.

This molecular bridge formed between inorganic substrates (such as minerals, fillers, metals, and cellulose) and organic/polymeric matrices (such as rubber, thermoplastics or thermosets) serves to improve the physical and mechanical properties of composite materials. Due to their versatility, organofunctional silanes in combination with metal alkoxides precursors are also used to make films, resins, polysilsesquioxanes, xerogels, and aerogels using sol-gel technology.

Typically, organosilane molecules have two reactive centers. One is characterized by having at least one hydrolytically stable carbon-silicon bond with a non-reactive or reactive organic functionality such as alkyl, aryl, arylalkyl, perflurophenylalkyl, trifluoropropyl, perfluoroalkyl, amino, ureido, epoxy, aldehyde, ethylene, and anhydride. The second reactive center on the silicon atom is characterized by one, two or three hydrolysable groups, mainly chloro, alkoxy, and amine.

The hydrolysable component of organofunctional silanes will hydrolyze readily with water to form silanols allowing silicon to covalently bond to inorganic surfaces via a condensation reaction to form a siloxane bond.

In addition to forming covalent siloxane bonds with inorganics substrates, the nature of the carbon-silicon bond provides improved resistance to hydrolysis attack at the interphase between the siloxane bond and the substrate. This feature makes a matrix composite material more hydrolytically stable; hence increasing service life by providing protection against corrosion and enhancing its mechanical properties.

The organosilanes can be tri-, di-, or mono-functional. The tri- and di-functional silanes (e.g. trimethoxysilane, methyldimethoxysilane) hydrolyze first to form a silanol and then condense with surface hydroxyl groups to form a hydrolytically stable siloxane bond and further crosslink to form a multilayer silsesquioxane or polymeric coating. This multilayer forms a boundary layer at the inorganic interphase and could diffuse into a porous matrix to create an interpenetrating network within the inorganic substrate; in turn, this forms a more hydrolytically stable matrix composite material.

The organic functionality of silane coupling agents which is attached by means of an alkyl spacer directly to the silicon atom that attaches to the surface by forming a siloxane bond and which in turn crosslinks with other silane molecules on the surface forming a silsesquioxane coating which entangle and bury the organofunctional groups that are attached directly to the silicon atom. This results in a variable film thickness when applied and leads to the need for higher silane loadings because a number of the organofunctional groups are not at the surface. This results in a non-uniform surface coating which requires higher loading of silane couplings agents to get the desired surface coverage with organofunctional groups at the surface of the coating. This entanglement compounds the problem by creating voids within the surface coating resulting in composite materials with poor wear resistance.

In certain applications, where composite materials are subjected to repeated mechanical stresses caused by thermal, vibrational and mechanical forces, they fail in their intended application because of delamination and stress fractures. These types of failures are a direct result of the rigid nature of the bonding mechanism of traditional silane coupling agents with the inorganic substrate.

Another important aspect of the industrial use of couplings agents is their uniform dispersion in resins. This can be challenging in the development of certain types of composite materials because traditional silane coupling agents are sometimes not compatible with certain types of resins. This results in non-homogeneous mixtures. In short periods of time these non-homogeneous mixtures result in unstable product formulations due to phase separation.

Certain types of organosilicon coupling agents are known in the prior art. WO1988007536A describes organosilicon coupling agents and particularly certain organosiloxane oligomers possessing advantageous properties when employed with materials having surface groups capable of condensing with silanol or silalkoxy groups. The coupling agent results from the hydrolysis and polymerization of at least one organosilane having a silicon-bonded organofunctional group and three silicon-bonded hydrolysable groups.

U.S. Pat. No. 4,308,371A describes a method of producing organopolysiloxanes by using organoalkoxysilanes and/or mixtures of organoalkoxysiloxanes as starting materials.

EP0691362B1 proposes a method of producing organopolysiloxanes by using organoalkoxysilanes and/or mixtures of organoalkoxysiloxanes as starting materials. The organoalkoxysilanes can be methyl trimethoxysilane or tetramethoxysilane, and the invention is different from U.S. Pat. No. 4,308,371A, mainly in that the alkoxy groups linked to the same silicon atom are of different reactivity.

US20040077757A discloses a coating composition produced by using two tetra-, tri- and dialkoxyfunctional organosilanes and an organic block copolymer as starting materials. The coating will be brittle when organic modification is kept at a low level, due to the similar starting materials and curing process as U.S. Pat. No. 4,308,371A. If the level of organic modification is increased, the coating will be less resistant to UV-rays, heat and oxidation.

Moreover, the known organofunctional pentasiloxanes reported in U.S. Pat. Nos. 5,194,649A, 5,183,912A and EP0499233B1 are made by a multiple step process. In the first process step an organofunctional tetrasiloxane is isolated via a ring opening polymerization reaction. In the second step, the isolated organofunctional tetrasiloxane is converted and isolated to a hydroxyl terminated tetrasiloxane via a hydrolysis reaction. In the third step, the isolated hydroxyl terminated tetrasiloxane undergoes a condensation reaction with tetramethoxysilane and isolated to yield an organofunctional pentasiloxane. In the fourth and final step, the organofunctional pentasiloxane is used in a hydrosilylation reaction to produce glycidoxyproplypentasiloxane.

There are other methods to produce organofunctional pentasiloxanes as described in U.S. Pat. No. 5,686,641A, 585,645A and U.S. Pat. No. 6,133,394A. There is also extensive prior art about ring opening anionic polymerization reactions using solutions of pyrophoric alkyl lithium reagents, cyclotrisiloxanes, chlorosilanes, solvents such as tetrahydrofuran, and hydrogen chloride scavengers such as triethylamine to produce organofunctional siloxanes with narrow polydispersivity.

However, the numbers of product intermediates, production time, reactor space yields and isolated product from these multiple step processes have limited commercial viability from an economic standpoint.

There is surprisingly no mention in the prior art of organofunctional tetrasiloxanes coupling agents and there is also no prior art regarding addition reactions to produce the mono-organofunctional siloxanes of the current invention.

SUMMARY OF INVENTION

The present invention proposes a novel method for preparing organofunctional siloxane coupling agents in high yields. The novel organofunctional siloxanes of this invention uniformly increase the boundary layer between the organofunctional group and the substrates surface by four siloxane units. The inherent advantage of the novel organofunctional siloxane coupling agents is that they naturally increase the boundary layer between the organofunctional group and the surface by means of the trisiloxane spacer between the organic functionality and the silicon atom that covalently attaches to the surface by means of a siloxane bond(s).

This new property provides the organofunctional group with higher degrees of freedom that prevents entanglement of the organofunctional groups within the surface coating. This provides silicon coupling agents with additional features: uniform surface coverage and flexibility between the organofunctional groups and the surface. This provides a mechanism to dissipate stresses that result from mechanical, thermal and vibrational forces while maintaining the desired physical and mechanical properties. Consequently, this increases their wear resistance.

In a first aspect, the present invention provides an organofunctional siloxane coupling agent having the formula (I)

$$XR^1SiR_2O(SiR_2O)_nSiR_3 \quad (I)$$

Where the group X is an organofunctional group selected from hydrogen, hydroxyl, aldehyde, acetate, amino, alkylimine, alkylamino, dialkylamino, diaminoalkyl, ureido, isocyanate, anhydride, epoxycyclohexyl, glycidoxy, mercapto, acryloxy, methacryloxy, methacrylamide, acrylamide, alkylamide, carboxylic acid, alkenyl, 2-hydroxy-3-(methacryloyloxy)propan-1-olate, alkyl, cycloalkyl, aryl, alkylaryl, arylalkyl, cycloalkyl, aryloxy, perfluoroalkyl, perfluoroaryl, alkylpolyalkylenoxy or hydroxypolyalkylenoxy; the group R is independently an organic group selected from a halogen, hydrogen, hydroxyl, alkyl, alkenyl, alkynyl, cycloalkyl, aryl, arylalkyl, alkylaryl and dialklyaryl, and alkoxy, acyloxy, alkyloyl, carbinoyl acyloxy group, alkylamine, dialkylamine, oximino or enoxy; the group $R^1$ is a divalent organic group, preferably methyl, ethyl, propyl, butyl, isobutyl, phenyl or phenethyl; and n is an integer having a value of 2 to 100, preferably 2 to 20 and more preferably 2.

Furthermore, the invention relates to the addition reaction of a hydrido alkoxysilane and organofunctional disiloxanes to an organocyclosiloxane with a catalyst to produce functional organosiloxanyl compounds. The addition reaction of the current invention does not result in polymerization and therefore the novel siloxane coupling agents are free of cyclosiloxanes and polymeric siloxanes. This makes them apt for adhesives, coatings and sealant applications. Their introduction will also result in hydrophilic, hydrophobic, superhydrophobic, and oleophobic surface coatings with improved wear resistance.

In a second aspect, the present invention provides a method for preparing organofunctional siloxanes having the formula (II)

$$HSiR_2O(SiR_2O)_nSiR_3 \quad (II)$$

by an addition reaction in the presence of a catalyst of a hydrido alkoxysilanes having the formula (III)

$$HSiR_3 \quad (III)$$

to a cyclosiloxane having the formula (IV)

$$(SiR_2O)_p \quad (IV)$$

whose substituents are defined above and where D is an integer having a value from 3 to 12.

In a third aspect of the invention, the present invention provides a method for preparing organofunctional siloxanes having the formula (V)

$$XR^1SiR_2(OSiR_2)_{n+1}OSiR_3 \quad (V)$$

by an addition reaction, in the presence of a catalyst, of organofunctional disiloxanes having the formula (VI)

$$XR^1SiR_2OSiR_3 \quad (VI)$$

to cyclosiloxanes of formula (IV)

$$(SiR_2O)_D \quad (IV)$$

whose substituents are defined above.

In the method of the third aspect of the invention, a solution of said organofunctional disiloxane and cyclosiloxane is passed through a plug flow reactor with a solid supported catalyst bed.

The catalyst is a Brønsted acid catalyst or a Lewis acid catalyst. The Brønsted acid catalyst is selected from the group of hydrogen chloride, nitric acid, sulfuric acid, trifluoromethanesulfonic acid or trifluoroacetic acid and preferably is trifluoromethanesulfonic acid. The Lewis acid acid catalyst is selected from the group of $ZnCl_2$, $BeCl_2$, $TeCl_4$, $SnCl_4$, $FeCl_3$, $FeCl_2$, $SbCl_5$, $AlCl_3$ or other metal halides and preferably is $FeCl_3$ or $AlCl_3$.

The solid support for the catalyst, in the method of the third aspect of the invention, is carbon, porous resin, zeolite, clay, and silica and preferably is an ion exchange resin.

In a fourth aspect of the invention, the present invention provides an organofunctional dipodal siloxane having the formula (VII)

$$R_3SiO(R_2SiO)_nSiR_2R^2SiR_2(OSiR_2)_nOSiR_3 \quad (VII)$$

Where $R^2$ is a divalent organic group and other substituents as defined above

In a fifth aspect of the invention, the present invention provides an organofunctional sulfido dipodal siloxane having the formula (VIII)

$$R_3SiO(R_2SiO)_n(SiR_2)R^1S_yR^1(SiR_2)(OSiR_2)_nOSiR_3 \quad (VIII)$$

whose substituents are defined above and where y is an integer with a value from 1 to 100 and preferable 2 to 4.

In a sixth aspect of the invention, the present invention provides an organofunctional siloxane block copolymer having the formula (IX)

$$QC(ABA)_mCQ \quad (IX)$$

Where the group Q is an organofunctional group selected from hydroxyl, vinyldimethylsiloxy, aminopropyldimethylsiloxy, trimethylsiloxy, dimethylsiloxy, methacryloxypropyldimethylsiloxy, methacryloxypropyldimethylsiloxy, mercaptopropyldimethylsiloxy, methacrylamidopropyldimethylsiloxy, acrylamidopropyldimethylsiloxy, ureidopropyldimethylsiloxy or cyanopropyldimethylsiloxy; the group A is a multivalent organic or organometallic group selected from dialkylamino, alkyl, dialklyaryl, perfluoroalkyl, dialkylpolyalkylenoxy, polyvinylmatallocene, dialkyldivinylsilane or dialkyldiallylsilane; the group B is a divalent organosiloxanyl group with the formula —$SiR_2O(SiR_2O)_6SiR_2$— whose substituents are defined above; the group C is a divalent organosiloxanyl group with the formula —$(SiR_2O)_4$— whose substituents are defined above; and m is an integer having a value of 1 to 1,000,000.

In a seventh aspect of the invention, the present invention provides a composition comprising the organofunctional siloxane compounds of formula $$XR^1SiR_2(OSiR_2)_{n+1}OSiR_3 \quad (V)$$

$$R_3SiO(R_2SiO)_nSiR_2R^2SiR_2(OSiR_2)_nOSiR_3 \quad (VII)$$

$$R_3SiO(R_2SiO)_n(SiR_2)R^1S_yR^1(SiR_2)(OSiR_2)_nOSiR_3 \quad (VIII)$$

whose substituents are defined above.

Moreover, other aspect is the general use of these organofunctional siloxanes that would include providing natural and synthetic rubbers, elastomers, polyurethanes, polyesters, resins and textiles with improved wear resistance for stain resistance, water repellency, oil and solvent resistance, moisture and oxygen permeability, heat resistance, slip, non-adhesive, anti-icing properties.

A novel aspect of the siloxane couplings agents of the present invention is that the treatment of inorganic fillers can be customized to make them more organically compatible with different types of resins or even modify the glass transition temperature of the composite materials to make them more apt for different working temperatures, e.g. applications in high and low temperature work environments.

One can also control the refractive index in order to eliminate haze that results from differences in refractive index to make clear transparent filled plastics and elastomers. This can be easily accomplished by changing the siloxane backbone from dimethylsiloxane to diethylsiloxane, phenylmethylsiloxane, diphenylsiloxane, trifluoroproplymethylsiloxane, phenethylmethylsiloxane, etc. Yet another aspect that is possible is the development of self-healing composites because it is well known that siloxane bonds can break and reform under certain types of conditions.

Specifically, in other aspect of the invention, the present invention provides the use of the composition, according to the seventh aspect of the invention, for the treatment of fillers.

The fillers can be quartz, silica, glass, aluminum, clays, silicon, copper, tin, talc, inorganic oxides, steel, asbestos, nickel, zinc, lead, marble, gypsum, graphite or carbon and preferably quartz, silica, glass, clays, silicon and inorganic oxides.

Furthermore, the compounds of said composition form covalent bonds with the filler surface and the boundary layer between the filler surface and the silicon atom bearing the organofunctional group that ranges from 1.5 to 20 Å and preferably 9-11 Å.

The treated fillers with conventional coupling agents form a boundary layer via the formation of covalent and hydrogen bonds that is at least 1.5 Å. Increasing the boundary layer between the organofunctional group and the substrate is also an extremely important and an attractive property for certain applications where surface interactions with the substrate are highly undesirable such as in biomedical devices, implantable medical devices, microfluidic devices, liquid chromatography phases, sensors, and microelectronics and semiconductor encapsulants. One can select the surface attachment mode from a mono-functional to form SAMs (self-assembled-monolayers) to the traditional di-functional and tri-functional mechanism.

In other aspect of the invention, the present invention provides the use of the composition, according to the seventh aspect of the invention, for the treatment of surfaces, specifically for promoting the adhesion of the surfaces. The surfaces can be glass, titanium dioxide, natural and synthetic stone, marble, silicon or plastics.

In addition, due to regulatory demands to reduce VOC emissions, and also because the high VOC load from the more reactive traditional silane couplings agents that creates a dangerous flammable work environment that can result in a serious fire hazard, many industrial applications are forced to select silane coupling agents with a slower reactivity. The effectiveness of the novel siloxane couplings agents lowers the VOC content, and thus increases the flash point, creating a safer work environment while maintaining the faster reactivity and physical properties with the added benefit of wear resistance.

There are also increasing industrial and regulatory trends to reduce or eliminate the use of silicones in cosmetic and textile industries. The organofunctional siloxy terminated silicone block copolymers of the current invention provide a means for reducing the siloxane footprint in formulations and yet maintaining the desirable properties that are expected from conventional silicones and methicones; such smooth non-greasy dry feel, hand, stain resistance, water repellency, moisture and oxygen permeability, etc.

These versatile siloxane copolymers can also be devised to contain polar groups that can achieve good adhesion through hydrogen bonding. The significant reduction of the siloxane footprint creates an opportunity for those skilled in the art to develop new cosmetic and textile applications.

BRIEF DESCRIPTION OF DRAWINGS

The following examples are provided by way of illustration, and they are not intended to be limiting of the present invention. Furthermore, the present invention covers all possible combinations of particular and preferred embodiments described herein.

DESCRIPTION OF EMBODIMENTS

Figure 1:
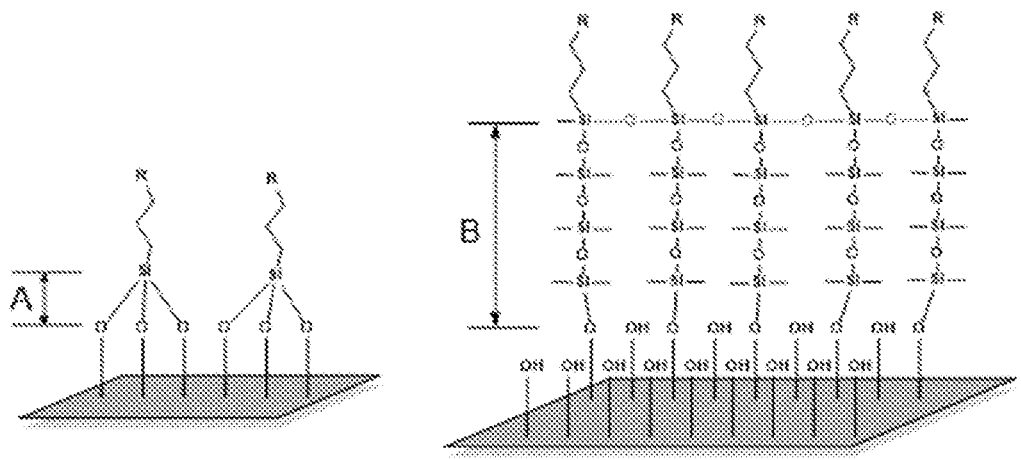
FIG. 1 shows the boundary layer based on published data for typical Si—O bond distances as well as crystallographic data available containing the siloxane moiety. The boundary layer via the formation of covalent and hydrogen bonds (A) that is at least 1.5 Å. The boundary layer between the filler surface and the silicon atom bearing the organofunctional group (B) is 9-11 Å

The following examples illustrate the embodiments of the invention that are presently best known. However, it is to be understood that the following are only exemplary or illustrative of the application of the principles of the present invention. Those skilled-in-the-art, in light of the present disclosure, will appreciate that many changes can be made in the specific embodiments which are disclosed herein and still obtain alike or similar result without departing from or exceeding the spirit or scope of the disclosure. The appended claims are intended to cover such modifications and arrangements. Thus, while the present invention has been described above with particularity, the following examples provide further detail in connection with what are presently deemed to be the most practical and preferred embodiments of the invention.

Example 1: 1,7,7-trichloro-1,1,3,3,5,5-hexamethyl-7-octyltetrasiloxane

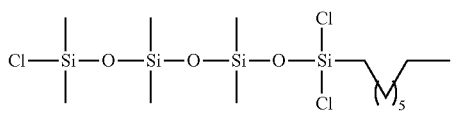

A 250-ml four neck glass reaction flask equipped with overhead stirring, reflux condenser, pot thermometer and addition funnel, is charged with 5 g of toluene and 0.095 g of 2 wt % Karsted's catalyst solution (20 ppm of Pt). The solution is heated to 90° C. and via an addition funnel a solution of 19.6 g (0.17 mol) of 1-octene and 75.13 g (0.17 mol) of 1,7,7-trichloro-1,1,3,3,5,5-hexamethyltetrasiloxane is added at such a rate to maintain the reaction temperature between 90 to 95° C. Once the addition of the solution is finished, the reactor contents are maintained at 90° C. for 30 minutes after which a sample is obtained for GC analysis to confirm that all the raw materials have been consumed. The product is then flash distilled to produce 1,7,7-trichloro-1,1,3,3,5,5-hexamethyl-7-octyltetrasiloxane with a purity of 97% by GC analysis resulting in a 90% isolated yield.

Example 2: 1-chloro-1,1,3,3,5,5,7,7-octamethyl-7-octyltetrasiloxane

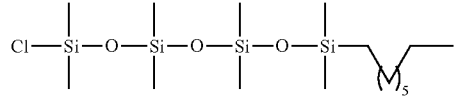

A 5-liter four neck glass reaction flask equipped with overhead stirring, reflux condenser, pot thermometer and addition funnel is charged with 400 g of toluene. The toluene is heated to 90° C. and 1.60 g of 2 wt % Karsted's catalyst solution (20 ppm of Pt) is added to the reaction flask. A solution of 1173 g (3.7 mol) of 1-chloro-1,1,3,3,5,5,7,7-octamethyltetrasiloxane and 436 g (3.9 mol) of 1-octene is added via an addition funnel at rate to maintain the reaction temperature between 90 to 100° C. Once the addition is finished, the reactor contents are kept at 100° C. for 30 minutes after which a sample is obtained for GC analysis to confirm that all the raw materials have been consumed. The reaction solution is flash distilled to obtain 1492 g of 1-chloro-1,1,3,3,5,5,7,7-octamethyl-7-octyltetrasiloxane with a purity higher than 96%.

Example 3: 1-chloro-1,1,3,3,5,5,7,7-octamethyl-7-dodecyltetrasiloxane

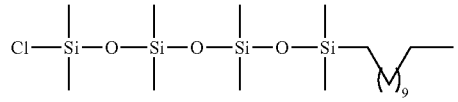

A 250-ml four neck glass reaction flask equipped with overhead stirring, reflux condenser, pot thermometer and addition funnel, is charged with 5 g of toluene and 0.11 g of 2 wt % Karsted's catalyst solution (20 ppm of Pt). The solution is heated to 90° C. and via an addition funnel a solution of 37.25 g (0.22 mol) of 1-dodecene and 71.81 g (0.22 mol) of 1-chloro-1,1,3,3,5,5,7,7-octamethyltetrasiloxane is added at such a rate to maintain the reaction temperature between 90 to 95° C. Once the addition of the solution is finished, the reactor contents are maintained at 90° C. for 30 minutes after which a sample is obtained for GC analysis to confirm that the raw materials have been fully consumed; yielding 86% of the desired product (1-chloro-1,1,3,3,5,5,7,7-octamethyl-7-dodecyltetrasiloxane).

Example 4: 1-chloro-1,1,3,3,5,5,7,7-octamethyl-7-octadecyltetrasiloxane

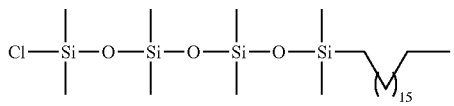

A 5-liter four neck glass reaction flask equipped with overhead stirring, reflux condenser, pot thermometer and addition funnel is charged with 500 g of toluene. The toluene is heated to 90° C. and 0.38 g of 2 wt % Karsted's catalyst solution (5 ppm of Pt) is added to the reaction flask. A solution of 835 g (2.63 mol) of 1-chloro-1,1,3,3,5,5,7,7-octamethyltetrasiloxane and 665 g (2.63 mol) of 1-octadecene is added via addition funnel at rate to maintain the reaction temperature between 90 to 110° C. Once the addition is finished, the reactor contents are kept at 110° C. for 30 minutes after which a sample is obtained for GC analysis to confirm that all the raw materials have been consumed. Lights and residual starting materials are removed via short path flash distillation at 260° C./<1 mmHg. The isolated product, 1275 g of 1-chloro-1,1,3,3,5,5,7,7-octamethyl-7-octadecyltetrasiloxane is a light-yellow liquid with a purity higher than 97% and a melting point of less than 5° C.

Example 5: 1-chloro-1,1,3,3,5,5,7,7-octamethyl-7-octacosyltetrasiloxane

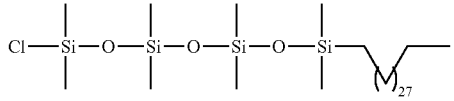

A 100-ml four neck glass reaction flask equipped with overhead stirring, reflux condenser, pot thermometer and addition funnel, is charged with 11.81 g (0.04 mol) of 1-chloro-1,1,3,3,5,5,7,7-octamethyltetrasiloxane, 0.03 g of 2 wt % Karsted's catalyst solution (20 ppm of Pt) and 8.77 g of toluene. The solution is heated to 90° C. and 15.31 g (0.04 mol) of 1-triacontene are added in portions at such a rate to maintain the reaction temperature between 90 to 95° C. Once the addition of the solution is finished, the reactor contents are maintained at 90° C. for 30 minutes after which a sample is obtained for GC analysis to confirm that the raw materials have been fully consumed. The final product, 1-chloro-1,1,3,3,5,5,7,7-octamethyl-7-octacosyltetrasiloxane, was isolated as a waxy solid that can be easily dissolved in toluene to make a 50 wt % liquid solution.

Example 6: 1-chloro-1,1,3,3,5,5,7,7-octamethyl-7-(14-(2,5,8,11-tetraoxatetradecane)-yl)tetrasiloxane

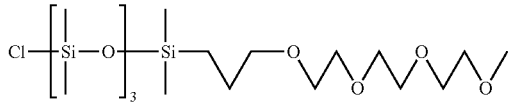

A 100-ml four neck glass reaction flask equipped with overhead stirring, reflux condenser, pot thermometer and addition funnel, is charged with 1.4 g of toluene and 0.03 g of 2 wt % Karsted's catalyst solution (20 ppm of Pt). The solution is heated to 90° C. and via an addition funnel, a solution of 10.52 g (0.05 mol) of allyl methoxy triethylene glycol ether and 16.72 g (0.05 mol) of 1-chloro-1,1,3,3,5,5,7,7-octamethyltetrasiloxane solution is added at such a rate to maintain the reaction temperature between 90 to 95° C. Once the addition of the solution is finished, the reactor contents are maintained at 90° C. for 30 minutes after which a sample is obtained for GC analysis to confirm that the raw materials have been fully consumed; yielding the desired product 1-chloro-1,1,3,3,5,5,7,7-octamethyl-7-(14-(2,5,8,11-tetraoxatetradecane)-yl)tetrasiloxane with a purity of 96% after lights strip.

Example 7: 1-chloro-1,1,3,3,5,5,7,7-octamethyl-7-(3-(perfluorophenyl)propyl)tetrasiloxane

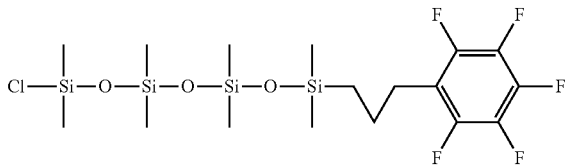 [SMILES: C[Si](C)(Cl)O[Si](C)(C)O[Si](C)(C)O[Si](C)(C)CCCc1c(F)c(F)c(F)c(F)c1F]

A 100-ml four neck glass reaction flask equipped with overhead stirring, reflux condenser, pot thermometer and addition funnel, is charged with 5.31 g (0.02 mol) of 1-chloro-1,1,3,3,5,5,7,7-octamethyltetrasiloxane and 0.01 g of 2 wt % Karsted's catalyst solution (20 ppm of Pt). The solution is heated to 90° C. and via an addition funnel, 3.41 g (0.02 mol) of allylpentafluorobenzene is added at such a rate to maintain the reaction temperature between 90 to 95° C. Once the addition is finished, the reactor contents are maintained at 90° C. for 30 minutes after which a sample is obtained for GC analysis to confirm that the raw materials have been fully consumed; yielding 76% of the desired product 1-chloro-1,1,3,3,5,5,7,7-octamethyl-7-(3-(perfluorophenyl)propyl)tetrasiloxane.

Example 8: 1-chloro-1,1,3,3,5,5,7,7-octamethyl-7-(3-cyanopropyl)-tetrasiloxane

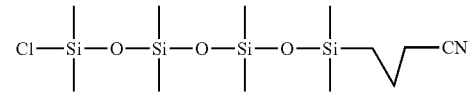

A 2-liter four neck reaction flask equipped with overhead stirring, reflux condenser, pot thermometer and addition funnel is charged with 200 g of toluene. The solution is heated to 90° C. and 0.30 g of chloroplatinic acid hexahydrate, 5 wt % in THF, is charged to the reaction flask. A solution of 538 g (1.70 mol) of 1-chloro-1,1,3,3,5,5,7,7-octamethyltetrasiloxane and 120 g (1.78 mol) of allyl cyanide is added via addition funnel at a rate to maintain the reaction temperature between 90 to 100° C.; additional Pt catalyst solution is added during the addition. Once the addition is finished, the reactor contents are kept at 110° C. for 60 minutes. The reaction solution is flash distilled to obtain 555 g of 1-chloro-1,1,3,3,5,5,7,7-octamethyl-7-(3-cyanopropyl)-tetrasiloxane with a purity higher than 90% at 120° C./1 mmHg.

Example 9: 1-chloro-1,1,3,3,5,5,7,7-octamethyl-7-(3-phenylpropyl)tetrasiloxane

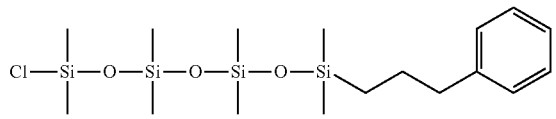 [SMILES: C[Si](C)(Cl)O[Si](C)(C)O[Si](C)(C)O[Si](C)(C)CCCc1ccccc1]

A 1-Liter four neck glass reaction flask equipped with overhead stirring, reflux condenser, pot thermometer and addition funnel, is charged with 75 g of toluene. The solution is heated to 90° C. and 0.66 g of chloroplatinic acid hexahydrate, 5 wt % in THF, is charged to the reaction flask. A solution of 480 g (1.51 mol) of 1-chloro-1,1,3,3,5,5,7,7-octamethyltetrasiloxane and 179 g (1.51 mol) of allylbenzene is added via addition funnel at a rate to maintain the reaction temperature between 90 to 110° C. Once the addition is finished, the reactor contents are kept at 120° C. for 60 minutes. After flash distillation, 600 g of 1-chloro-1,1,3,3,5,5,7,7-octamethyl-7-(3-phenylpropyl)tetrasiloxane are obtained with a purity higher than 96%.

Example 10: 1-chloro-1,1,3,3,5,5,7,7-octamethyl-7-(3-methacryloxypropyl)tetrasiloxane

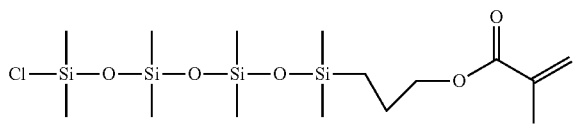 [SMILES: C=C(C)C(=O)OCCC[Si](C)(C)O[Si](C)(C)O[Si](C)(C)O[Si](C)(C)Cl]

A 1-liter four neck glass reaction flask equipped with overhead stirring, reflux condenser, pot thermometer and addition funnel, is charged with 75 g of toluene, 0.1521 g of BHT and 0.2535 g of phenothiazine. The solution is heated to 90° C. and 0.12 g of 2 wt % Karsted's catalyst solution (20 ppm of Pt) is added to the reaction flask. A solution of 89.42 g (282 mmol) of 1-chloro-1,1,3,3,5,5,7,7-octamethyl-tetrasiloxane and 37.36 g (296 mmol) of allymethacrylate is added via addition funnel at a rate to maintain the reaction temperature between 70 to 80° C. Once the addition is finished, the reactor contents are kept at 80° C. for 30 minutes. After removal of lights under vacuum at 80° C., 120 g of 1-chloro-1,1,3,3,5,5,7,7-octamethyl-7-(3-methacryloxypropyl)tetrasiloxane with a purity higher than 80% is obtained.

Example 11: 1-chloro-1,1,3,3,5,5,7,7-octamethyl-7-(3,3,4,4,5,5,6,6,7,7,8,8,8-tridecafluorooctyhtetrasiloxane

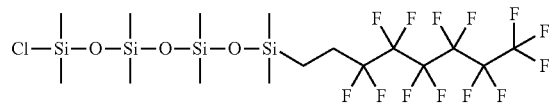 [SMILES: C[Si](C)(Cl)O[Si](C)(C)O[Si](C)(C)O[Si](C)(C)CCC(F)(F)C(F)(F)C(F)(F)C(F)(F)C(F)(F)C(F)(F)F]

A 1 liter four neck glass reaction flask equipped with overhead stirring, reflux condenser, pot thermometer and addition funnel, is charged with 104.5 g of toluene and is heated to 90° C. 0.3 g Karsted's catalyst solution 2 wt % Pt are added to the reaction flask and a solution of 166.0 g 1-chloro-1,1,3,3,5,5,7,7-octamethyltetrasiloxane (93%, 0.48 mol) and 281.0 g 1H,1H,2H perfluorooctene (97%, 0.70 mol) is added via the addition funnel at a rate to maintain the reaction temperature between 90 to 95° C. Once the addition of the solution is finished, the reactor contents are maintained at 90° C. for 30 minutes, time after which a sample is obtained for GC analysis to confirm that all the 1-chloro-1,1,3,3,5,5,7,7-octamethyltetrasiloxane has been consumed. The reactor is then equipped with a flash distillation apparatus and the reactor contents are stripped of lights under vacuum at 120° C./1 mm Hg and 1-chloro-1,1,3,3,5,5,7,7-octamethyl-7-(3,3,4,4,5,5,6,6,7,7,8,8,8-tridecafluorooctyl)tetrasiloxane is obtained with an isolated yield of 80%.

Example 12: 1-chloro-1,1,3,3,5,5,7,7-octamethyl-7-(3-chlorobutyl)-tetrasiloxane

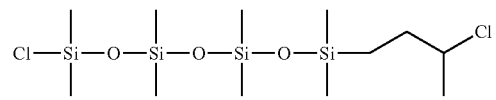 [SMILES: CC(Cl)CC[Si](C)(C)O[Si](C)(C)O[Si](C)(C)O[Si](C)(C)Cl]

A 5-liter four neck glass reaction flask equipped with overhead stirring, reflux condenser, pot thermometer and addition funnel is charged with 250 g of toluene. The solution is heated to 90° C. and 3.30 g of Karsted's catalyst solution (2 wt % Pt) (20 ppm of Pt) are added to the reaction flask. A solution of 2571 g (8.10 mol) of 1-chloro-1,1,3,3,5,5,7,7-octamethyltetrasiloxane and 742 g (8.20 mol) of 3-chlorobut-1-ene is added via addition funnel at a rate to maintain the reaction temperature between 90 to 110° C. Once the addition is finished, the reactor contents are kept at 120° C. for 60 minutes. After fractional distillation, 1700 g of 1-chloro-1,1,3,3,5,5,7,7-octamethyl-7-(3-chlorobutyl)-tetrasiloxane with a purity higher than 96% at 102-104/1 mmHg were obtained.

Example 13: 1-methoxy-1,1,3,3,5,5,7,7-octamethyl-7-(3-chlorobutyl)-tetrasiloxane

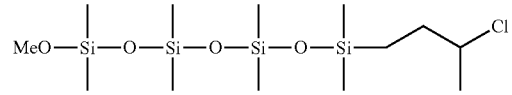 [SMILES: CO[Si](C)(C)O[Si](C)(C)O[Si](C)(C)O[Si](C)(C)CCC(C)Cl]

A 5-liter four neck glass reaction flask equipped with overhead stirring, Vigreaux column, distillation head, pot thermometer and addition funnel, is charged with 1290 g (3.17 mol) of 1-chloro-1,3,3,5,5,7,7-octamethyl-7-(3-chlorobutyl)-tetrasiloxane. After heating to 95-100° C., 370 g (1.1 mol) of TMOA are added. After 6 h at 100° C. esterification is finished. A flash distillation results in 1238 g of 1-methoxy-1,1,3,3,5,5,7,7-octamethyl-7-(3-chlorobutyl)-tetrasiloxane with a purity higher than 98%.

Example 14:
1,7,7-triethoxy-1,1,3,3,5,5-hexaethyltetrasiloxane

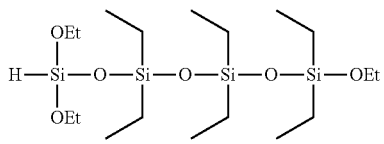 [SMILES: CCO[SiH](OCC)O[Si](CC)(CC)O[Si](CC)(CC)O[Si](CC)(CC)OCC]

A 250-ml four neck glass reaction flask equipped with magnetic stirring, reflux condenser and pot thermometer, is charged with 26.79 g (0.16 mol) of triethoxysilane and 100 μL of trifluoromethanesulphonic acid. Subsequently, 50 g (0.163 mol) of 2,2,4,4,6,6-hexaethyl-1,3,5,2,4,6-trisiloxane are added dropwise during 40 minutes. The reaction is monitored by means of GC until all the hexaethylcyclotrisiloxane is consumed. At that point 1 mL of hexamethyldisilazane is added to the reaction to reach neutral pH. The final product is isolated by fractional distillation with purity higher than 97% and an isolated yield of 85% of 1,7,7-triethoxy-1,1,3,3,5,5-hexaethyltetrasiloxane.

Example 15: 1,7,7-trimethoxy-1,1,3,3,5,5-hexamethyltetrasiloxane

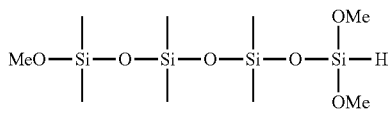 [SMILES: CO[SiH](OC)O[Si](C)(C)O[Si](C)(C)O[Si](C)(C)OC]

A 2-liter four neck glass reaction flask equipped with overhead stirring, reflux condenser and pot thermometer is charged with 274 g (2.14 mol) of trimethoxysilane and 85 μL of trifluoromethanesulphonic acid. Subsequently, 399 g (1.79 mol, 1 eq.) of hexamethylcyclotrisiloxane are added in 8 portions of 50 g each, making sure that each portion of hexamethylcyclotrisiloxane is completely dissolved before adding the next one. The reaction is monitored by means of GC with TCD detector until all the hexamethylcyclotrisiloxane is consumed. At that point 1 mL of hexamethyldisilazane is added to the reaction to reach neutral pH. The final product is isolated by fractional distillation with purity higher than 99% and an isolated yield of 70% of 1,7,7-trimethoxy-1,1,3,3,5,5-hexamethyltetrasiloxane. The excess of trimethoxysilane is also recovered to be used in further reactions.

Example 16: 1,7,7-triethoxy-1,1,3,3,5,5-hexamethyltetrasiloxane

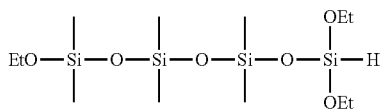

A 3-liter four neck glass reaction flask equipped with overhead stirring, reflux condenser and pot thermometer, is charged with 866 g (6.08 mol, 1.1 eq) of triethoxysilane and 250 μL of trifluoromethanesulphonic acid. Subsequently, 1066 g (5.57 mol, 1 eq.) of hexamethylcyclotrisiloxane are added in 8 portions of 135 g each, making sure that each portion of hexamethylcyclotrisiloxane is completely dissolved before adding the next one. The reaction is monitored by means of GC with TCD detector until all the hexamethylcyclotrisiloxane is consumed. At that point 2 mL of hexamethyldisilazane is added to the reaction to reach neutral pH. The final product is isolated by fractional distillation with purity higher than 99% and an isolated yield of 60%. The excess of triethoxysilane is also recovered to be used in further reactions CH, $^{13}$C and $^{29}$Si NMR analysis confirm the structure of the product obtained.

Example 17:
1-ethoxy-1,1,3,3,5,5,7,7-octamethyltetrasiloxane

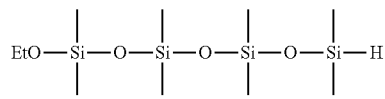

A 250-ml glass reaction flask equipped with magnetic stirring, reflux condenser and pot thermometer, is charged with 23.6 g (0.106 mol, 1 eq.) of hexamethylcyclotrisiloxane and 33.17 g of dimethylethoxysilane (0.318 mol, 3 eq.). To this homogeneous solution, 85 μL of trifluoromethanesulphonic acid are added to acid pH. An exotherm is then observed indicating the progress of the reaction. When the maximum temperature is reached, the solution is neutralized with 1 mL of hexamethyldisilazane. By means of a flash distillation the excess of dimethylethoxysilane is recovered while the final pot (1-ethoxy-1,1,3,3,5,5,7,7-octamethyltetrasiloxane) is used without further purification in the next step (Example 23).

Example 18: 1,7-dimethoxy-1,1,3,3,5,5,7-heptamethyl-7-octyltetrasiloxane

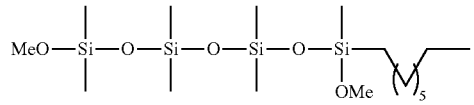

A 250-ml four neck glass reaction flask equipped with overhead stirring, reflux condenser, pot thermometer and addition funnel, is charged with 5 g of toluene and 0.03 g of 2 wt % Karsted's catalyst solution (20 ppm of Pt). The solution is heated to 90° C. and via an addition funnel, a solution of 9.56 g (0.085 mol) of 1-octene and 20 g (0.085 mol) of 1,7-dimethoxy-1,1,3,3,5,5,7-heptamethyltetrasiloxane is added at such a rate to maintain the reaction temperature between 90 to 95° C. Once the addition of the solution is finished, the reactor contents are maintained at 90° C. for 30 minutes after which a sample is obtained for GC analysis to confirm that the raw materials have been fully consumed yielding 89% of the desired product 1,7-dimethoxy-1,1,3,3,5,5,7-heptamethyl-7-octyltetrasiloxane.

Example 19: 1-methoxy-1,1,3,3,5,5,7,7-octamethyl-7-(3-(oxiran-2-ylmethoxy)propyl)tetrasiloxane

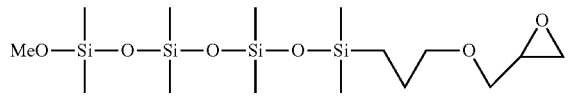 [SMILES: CO[Si](C)(C)O[Si](C)(C)O[Si](C)(C)O[Si](C)(C)CCCOCC1CO1]

A 22-liter four necked glass reaction flask equipped with overhead stirring, reflux condenser, pot thermometer and addition funnel is charged with 1087 g toluene are heated to 90° C. Then 6.11 g of Karsted's catalyst solution 2 wt % Pt is added to the reaction flask and a solution of 4528 g 1-methoxyoctamethyltetrasiloxane (99%, 14.32 mol) and 1722 g allylglycidyl ether (96%, 14.32 mol) is added via the addition funnel at a rate to maintain the reaction temperature between 90 to 95° C. Once the addition of the solution is finished, the reactor contents are maintained at 90° C. for 30 minutes, time after which a sample is obtained for GC analysis to confirm that all the 1-methoxy-1,1,3,3,5,5,7,7-octamethyltetrasiloxane has been consumed. The reactor is then equipped with a flash distillation apparatus and the reactor contents are stripped of lights at 80° C./2 mm Hg. The product is distilled under vacuum at 125° C./1 mm Hg, to obtain 1-methoxy-1,1,3,3,5,5,7,7-octamethyl-7-(3-(oxiran-2-ylmethoxy)propyl)tetrasiloxane with a purity of 93% by GC analysis. The isolated yield is 92%.

Example 20: 1,7-dimethoxy-1,1,3,3,5,5,7-heptamethyl-7-(3-(oxiran-2-ylmethoxy)propyl)tetrasiloxane

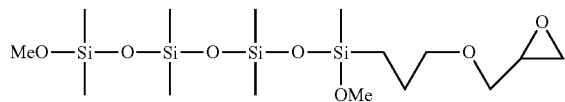 [SMILES: CO[Si](C)(C)O[Si](C)(C)O[Si](C)(C)O[Si](C)(CCCOCC1CO1)OC]

A 100-ml four neck glass reaction flask equipped with magnetic stirring, reflux condenser, pot thermometer and addition funnel, is charged with 5 g of toluene and 0.018 g of 2 wt % Karsted's catalyst solution (20 ppm Pt). The solution is heated to 90° C. and via an addition funnel a solution of 4.51 g (0.04 mol) of allylglycidyl ether and 13 g (0.04 mol) of 1,7-dimethoxy-1,1,3,3,5,5,7-heptamethyltetrasiloxane is added at such a rate to maintain the reaction temperature between 90 to 95° C. Once the addition of the solution is finished, the reactor contents are maintained at 90° C. for 30 minutes after which a sample is obtained for GC analysis to confirm that the raw materials have been fully consumed yielding 88% of the desired product 1,7-dimethoxy-1,1,3,3,5,5,7-heptamethyl-7-(3-(oxiran-2-ylmethoxy)propyl)tetrasiloxane.

Example 21: 1,1,7-trimethoxy-3,3,5,5,7,7-hexamethyl-1-(3-methacryloxypropyl)tetrasiloxane

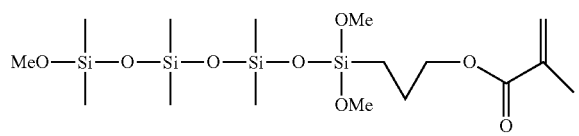 [SMILES: C=C(C)C(=O)OCCC[Si](OC)(OC)O[Si](C)(C)O[Si](C)(C)O[Si](C)(C)OC]

A 1-Liter glass reaction flask equipped with overhead stirring, reflux condenser, pot thermometer and addition funnel, is charged with 59 g of toluene, 1.1 g of 2 wt % Karsted's catalyst solution (20 ppm of Pt), 0.25 g of BHT and 1 g of phenothiazine. The solution is heated to 90° C. and via an addition funnel a solution of 370 g (1.073 mol) of 1,7,7-trimethoxy-1,1,3,3,5,5-hexamethyltetrasiloxane and 142 g (1,127 mol, 1.05 eq.) allyl methacrylate is added at such a rate to maintain the reaction temperature between 90 to 95° C. Once the addition of the solution is finished, the reactor contents are maintained at 90° C. for 30 minutes after which a sample is obtained for GC analysis to confirm that all the raw materials have been consumed. The product is then fractionally distilled to produce 293 g (0.622 mol) 1,1,7-trimethoxy-3,3,5,5,7,7-hexamethyl-1-(3-methacryloxypropyl)tetrasiloxane with a purity of 98% by GC analysis resulting in a 60% isolated yield. NMR analysis confirms that the product obtained is exclusively the result of an anti-Markovnikov addition.

Example 22: 1,1,7-triethoxy-3,3,5,5,7,7-hexamethyl-1-(3-(dihydrofuran-2,5-dione-3-yl)propyl)tetrasiloxane

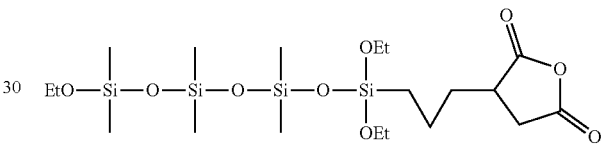

A 1-Liter glass reaction flask equipped with overhead stirring, reflux condenser, pot thermometer and addition funnel, is charged with 20 g of toluene, 0.09 g of 2 wt % Karsted's catalyst solution (20 ppm of Pt), and 25 g (0.178 mol) of 3-allyldihydrofuran-2,5-dione and heated to 90° C. Via an addition funnel, a solution of 68.99 g (0.178 mol) of 1,7,7-triethoxy-1,1,3,3,5,5-hexamethyltetrasiloxane is added at such a rate to maintain the reaction temperature between 90 to 95° C. Once the addition is finished, the reactor contents are maintained at 90° C. for 30 minutes after which a sample is obtained for GC analysis to confirm that all the raw materials have been consumed. The product is then flash distilled to produce 78 g (0.148 mol) of 1,1,7-triethoxy-3,3,5,5,7,7-hexamethyl-1-(3-(dihydrofuran-2,5-dione-3-yl)propyl)tetrasiloxane with a purity of 98% by GC analysis resulting in an 83% isolated yield. NMR analysis confirms the structure for the product obtained.

Example 23: 1-ethoxy-1,1,3,3,5,5,7,7-octamethyl-7-(3-(oxiran-2-ylmethoxy)propyl)tetrasiloxane

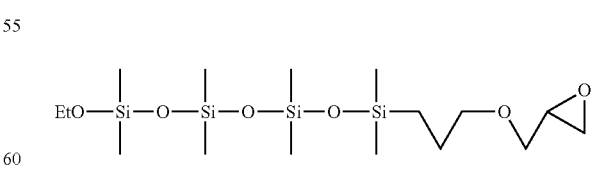

A 250-ml glass reaction flask equipped with overhead stirring, reflux condenser, pot thermometer and addition funnel, is charged with 5 g of toluene and 0.044 g of 2 wt % Karsted's catalyst solution (20 ppm of Pt) and heated to 95° C. Via an addition funnel a solution of 11.36 g (0.1 mol) of allylglycidyl ether and a crude of 32.5 g containing 77% of 1-ethoxy-1,1,3,3,5,5,7,7-octamethyltetrasiloxane (0.077 mol) is added at such a rate to maintain the reaction temperature between 95 to 110° C. Once the addition of the solution is finished, the reactor contents are maintained at 120° C. for 30 minutes after which a sample is obtained for GC analysis to confirm that the raw materials have been fully consumed. After a flash distillation 30 g of the desired 1-ethoxy-1,1,3,3,5,5,7,7-octamethyl-7-(3-(oxiran-2-yl-methoxy)propyl)tetrasiloxane have been isolated with a purity of 98% by GC analysis.

Example 24: 1,7,7-trimethoxy-1,1,3,3,5,5-hexam-ethyl-7-(3-(oxiran-2-ylmethoxy)propyl)tetrasiloxane

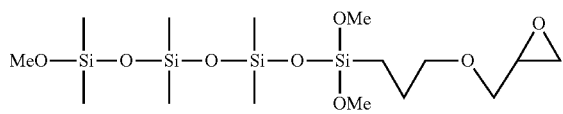 [SMILES: CO[Si](C)(C)O[Si](C)(C)O[Si](C)(C)O[Si](CCCOCC1CO1)(OC)OC]

A 1 L glass reaction flask equipped with overhead stirring, reflux condenser, pot thermometer and addition funnel, is charged with 75 g of toluene, 0.6 g of 2 wt % Karsted's catalyst solution (20 ppm of Pt), 0.17 g of BHT (300 ppm) and heated to 105° C. Via an addition funnel a solution of 430 g (1.25 mol) of 1,7,7-trimethoxy-1,1,3,3,5,5-hexameth-yltetrasiloxane and 178 g (1.56 mol, 1.25 eq.) of allyl glycidyl ether is added at such a rate to maintain the reaction temperature between 110 to 115° C. Once the addition of the solution is finished, the reactor contents are maintained at 120° C. for 30 minutes after which a sample is obtained for GC analysis to confirm that all the raw materials have been consumed. The product is then fractionally distilled to produce 354 g (0.77 mol) of 1,7,7-trimethoxy-1,1,3,3,5,5-hexamethyl-7-(3-(oxiran-2-ylmethoxy)propyl)tetrasiloxane with a purity of 98% by GC analysis.

Example 25: 1-methoxy-1,1,3,3,5,5,7,7-octamethyl-7-(3-aminopropyl)tetrasiloxane

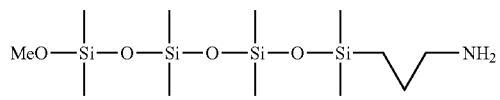 [SMILES: CO[Si](C)(C)O[Si](C)(C)O[Si](C)(C)O[Si](C)(C)CCCN]

A 2-liter four neck glass reaction flask equipped with overhead stirring, reflux condenser, pot thermometer and addition funnel is charged with 132 g toluene and is heated to 90° C. Then 0.1 g of Karsted's catalyst solution 2 wt % Pt are added to the reaction flask and a solution of 995 g 1-methoxy-1,1,3,3,5,5,7,7-octamethyltetrasiloxane (99%, 3.17 mol) and 196 g of allylamine (97%, 3.43 mol) is added via the addition funnel at a rate to maintain the reaction temperature between 90 to 95° C. Once the addition of the solution is complete, the reactor contents are maintained at 90° C. for 30 minutes, time after which a sample is obtained for GC analysis to confirm that all the 1-methoxy-1,1,3,3,5,5,7,7-octamethyltetrasiloxane has been consumed. The reactor is then equipped with a flash distillation set-up and the reactor contents are stripped of excess allylamine under vacuum (2 mm Hg) at 80° C. The product is distilled under vacuum at 110° C./1 mm Hg to obtain the desired product with a purity of 95% by GC analysis.

Example 26: 1-methoxy-1,1,3,3,5,5,7,7-octamethyl-7-(3-(methoxypolyethyleneoxy)propyl)tetrasiloxane

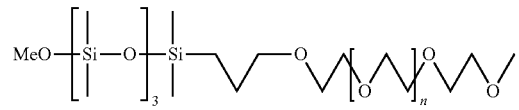

A 2 liter four neck glass reaction flask equipped with overhead stirring, reflux condenser, pot thermometer and addition funnel is charged with 181 g toluene and is heated to 90° C. 0.1 g Karsted's catalyst solution 2 wt % Pt are added to the reaction flask and a solution of 199.5 g 1-methoxy-1,1,3,3,5,5,7,7-octamethyltetrasiloxane (80%, 0.48 mol), 216.0 g of monoallyl terminated polyethylene oxide (MW 450) (0.48 k-mol) and 106.5 g of toluene are added via the addition funnel at a rate to maintain the reaction temperature between 90 to 95° C. Once the addition of the solution is finished, the reactor contents are maintained at 90° C. for 30 minutes, time after which a sample is obtained for GC analysis to confirm that all the 1-methoxy-1,1,3,3,5,5,7,7-octamethyltetrasiloxane has been consumed. The reactor is then equipped with a flash distillation apparatus and the reactor contents are stripped of lights under vacuum at 105° C./1 mm Hg to yield 315 g of 1-methoxy-1,1,3,3,5,5,7,7-octamethyl-7-(3-(methoxypoly-ethyleneoxy)propyl)tetrasiloxane.

Example 27: 1,1,1,3,3,5,5,7,7,9,9-undecamethylpentasiloxane

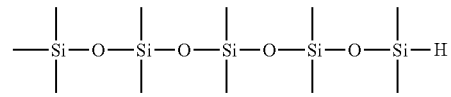 [SMILES: C[SiH](C)O[Si](C)(C)O[Si](C)(C)O[Si](C)(C)O[Si](C)(C)C]

A 22-Liter glass reaction flask equipped with overhead stirring, reflux condenser, pot thermometer, addition funnel and ice-bath, is charged with 4250 g of water and 952 g (17 mol) of KOH. To this solution, 1200 g of acetic acid 85% (17 mol) are added and the temperature is maintained at 75° C. Once the solution of potassium acetate has cooled to room temperature, a solution of 1540 g (4.86 mol) of 1-chloro-1, 1,3,3,5,5,7,7-octamethyltetrasiloxane and 1319 g (12.14 mol) of trimethylchlorosilane is added keeping the reaction temperature below 30° C. Once the addition is finished, the aqueous layer is discarded and the organic layer is fractionally distilled to produce 568 g (1.53 mol) of 1,1,1,3,3,5,5,7,7,9,9-undecamethylpentasiloxane with a purity of 99% by GC analysis.

Example 28: 1,1,1,3,3,5,5,7,7-nonamethyltetrasiloxane

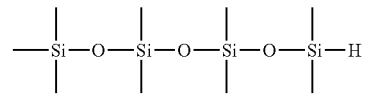 [SMILES: C[SiH](C)O[Si](C)(C)O[Si](C)(C)O[Si](C)(C)C]

In a 2 L flask 532 g of THF and 100 g of 1-chloro-1,1,3,3,5,5,7,7-octamethyltetrasiloxane are charged. With a water cooling bath, and under permanent stirring, 116 g methylmagnesium chloride (3M solution in THF) are added at a rate to keep the pot temperature below 35° C. The addition is finished after 130 minutes. After 18 hours, 248 g water are added via addition funnel. The reaction is exothermic. Aqueous and organic layers are separated in a separation funnel, and the latter is washed three times with 250 ml of water each time. The resulting crude is concentrated in a rotary evaporator under reduced pressure at 35° C./1 mm Hg to yield 82 grams of 1,1,1,3,3,5,5,7,7-nonamethyltetrasiloxane.

Example 29: 1,1,1,3,3,5,5,7,7,9,9-undecamethylpentasiloxane

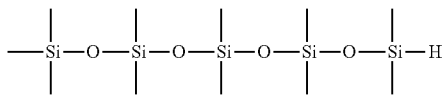

A continuous plug flow reactor (PFR) that consists of a 40-cm long column with ID of 25 mm s packed with a 15 cm catalyst bed of 37 g of Amberlyst® 15, Ion Exchange Resin, H+ Form. Through this PFR reactor, a homogeneous solution of 50 g (0.225 mol) of hexamethylcyclotrisiloxane, 33.28 g (0.225 mol) of pentamethyldisiloxane and 34.2 g of heptanes was passed at room temperature. The residence time was controlled to be one minute in order to obtain a reaction crude with 8,5% (GC analysis) of the desired product 1,1,1,3,3,5,5,7,7,9,9-undecamethylpentasiloxane.

Example 30: 1,1,1,3,3,5,5,7,7,9,9-undecamethylpentasiloxane

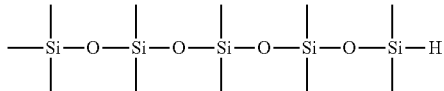 [SMILES: C[SiH](C)O[Si](C)(C)O[Si](C)(C)O[Si](C)(C)O[Si](C)(C)C]

A continuous plug flow reactor (PFR) that consists of a 20-cm long column with ID of 25 mm was packed with a 6 cm catalyst bed of 4 g of Amberlyst® 15, Ion Exchange Resin, H+ Form. Through this PFR reactor, a homogeneous solution of 15 g (0.067 mol) of hexamethylcyclotrisiloxane, 10 g (0.067 mol) of pentamethyldisiloxane, 18.7 g of acetonitrile and 9.94 g of toluene was passed at room temperature. The residence time was controlled to be five minutes in order to obtain a reaction crude with 10.6% (GC analysis) of the desired product 1,1,1,3,3,5,5,7,7,9,9-undecamethylpentasiloxane.

Example 31: 1-ethoxy-1,1,3,3,5,5,7,7-octamethyltetrasiloxane

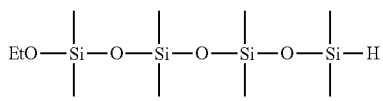

A continuous plug flow reactor (PFR) that consists of a 40-cm long column with ID of 25 mm was packed with a 15 cm catalyst bed of 36 g of Amberlyst® 15, Ion Exchange Resin, H+ Form. Through this PFR reactor, a homogeneous solution of 41 g (0.184 mol) of hexamethylcyclotrisiloxane and 56 g of dimethylethoxysilane (0.54 mol) was passed at room temperature. The residence time was controlled to be five minutes in order to obtain a reaction crude with 31.7% (GC analysis) of the desired product 1-ethoxy-1,1,3,3,5,5,7,7-octamethyltetrasiloxane.

Example 32: 1,1,3,3,5,5,7,7,9,9,9-undecamethyl-1-(3-methacryloxpropyl)pentasiloxane

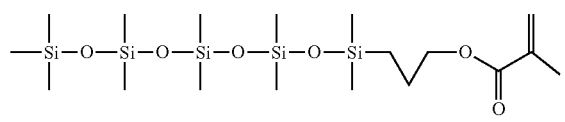 [SMILES: C=C(C)C(=O)OCCC[Si](C)(C)O[Si](C)(C)O[Si](C)(C)O[Si](C)(C)O[Si](C)(C)C]

A 1 L glass reaction flask equipped with overhead stirring, reflux condenser, pot thermometer and addition funnel, is charged with 120 g of toluene, 0.16 g of 2 wt % Karsted's catalyst solution (20 ppm of Pt), 0.16 g of BHT and 0.65 g of phenothiazine and heated to 90° C. Via an addition funnel, a solution of 150 g (0.42 mol) of 1,1,1,3,3,5,5,7,7,9,9-undecamethylpentasiloxane and 53.2 g (0.42 mol) of allyl methacrylate is added at such a rate to maintain the reaction temperature between 90 to 95° C. Once the addition of the solution is finished, the reactor contents are maintained at 90° C. for 30 minutes after which a sample is obtained for GC analysis to confirm that all the raw materials have been consumed. The product is then fractionally distilled to produce 77 g (0.154 mol) 1,1,3,3,5,5,7,7,9,9,9-undecamethyl-1-(3-methacryloxypropyl)pentasiloxane with a purity >95% by GC. NMR analysis confirms the structure of the product obtained.

Example 33: 1,1,1,3,3,5,5,7,7,9,9-undecamethyl-9-(3-(oxiran-2-ylmethoxy)propyl)pentasiloxane

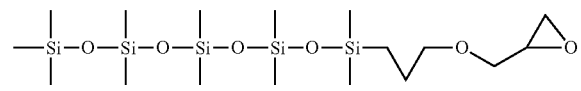 [SMILES: C[Si](C)(C)O[Si](C)(C)O[Si](C)(C)O[Si](C)(C)O[Si](C)(C)CCCOCC1CO1]

A 1 L glass reaction flask equipped with overhead stirring, reflux condenser, pot thermometer and addition funnel, is charged with 90 g of toluene and 0.31 g of 2 wt % Karsted's catalyst solution (40 ppm) and heated to 105° C. Via an addition funnel a solution of 96.8 g (0.261 mol) of 1,1,1,3,3,5,5,7,7,9,9-undecamethylpentasiloxane and 39.7 (0.34 mol, 1.3 eq.) of allyl glycidyl ether is added at such a rate to maintain the reaction temperature between 110 to 115° C. Once the addition of the solution is finished, the reactor contents are maintained at 120° C. for 30 minutes, time after which a sample is obtained for GC analysis to confirm that all the raw materials have been consumed. The product is then flash distilled to produce 102 g (0.21 mol) of 1,1,1,3,3,5,5,7,7,9,9-undecamethyl-9-(3-(oxiran-2-ylmethoxy)propyl)pentasiloxane with a purity >97% by GC analysis.

Example 34: 1,1,3,3,5,5,7,7,9,9,9-undecamethyl-1-(2-hydroxy-3-methacryloxypropyl)propyl)pentasiloxane

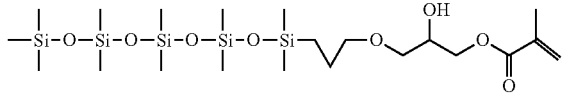 [SMILES: C=C(C)C(=O)OCC(O)COCCC[Si](C)(C)O[Si](C)(C)O[Si](C)(C)O[Si](C)(C)O[Si](C)(C)C]

A 1 L glass reaction flask equipped with overhead stirring, reflux condenser, pot thermometer and addition funnel, is charged with 300 g of toluene, 0.55 g of 2 wt % Karsted catalyst in xylene (40 ppm), 0.0834 g of BHT and heated to 70° C. Via an addition funnel a solution of 178 g (0.479 mol) of 1,1,1,3,3,5,5,7,7,9,9-undecamethylpentasiloxane and 100 g (0.479 mol, 1 eq.) 3-(allyloxy)-2-hydroxypropyl methacrylate dissolved in 100 g of toluene is added at such a rate to maintain the reaction temperature between 70 and 75° C. Once the addition of the solution is finished, the reactor contents are maintained at 75° C. for 30 minutes, time after which a sample is obtained for GC analysis to confirm that all the raw materials have been consumed. The product is then stripped to produce 156 g of 1,1,3,3,5,5,7,7,9,9,9-undecamethyl-1-(2-hydroxy-3-methacryloxypropoxypropyl)pentasiloxane with a purity >80%.

Example 35: 1,8-bis(7-methoxy-1,1,3,3,5,5,7,7-octamethyltetrasiloxanyl)octane

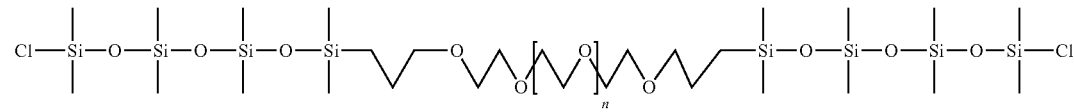

A 5-liter four neck glass reaction flask equipped with overhead stirring, reflux condenser, pot thermometer and addition funnel is charged with 340 g toluene and is heated to 90° C. 0.5 g Karsted's catalyst solution 2 wt % Pt are added to the reaction flask and a solution of 1824 g 1-methoxy-1,1,3,3,5,5,7,7-octamethyltetrasiloxane (99%, 5.69 mol) and 328 g of octadiene (95%, 2.84 k-mol) is added via the addition funnel at a rate to maintain the reaction temperature between 90 to 95° C. Once the addition of the solution is complete, the reactor contents are maintained at 90° C. for 60 minutes after which a sample is obtained for GC analysis to confirm that all the 1-methoxy-1,1,3,3,5,5,7,7-octamethyltetrasiloxane has been consumed. The reactor is then equipped with a flash distillation apparatus and the reactor contents are stripped of lights under vacuum (<1 mm Hg) at 205° C. 1718 g of 1,8-bis(7-methoxy-1,1,3,3,5,5,7,7-octamethyltetrasiloxanyl)octane were obtained resulting in a 90% isolated yield.

Example 36—Silanol Terminated poly{bis(octamethyltetrasiloxanylproply)octane} OH-A(BCB)$_n$A-OH A 1-liter four neck glass reaction flask equipped with overhead stirring, reflux condenser, pot thermometer and addition funnel is charged with 158 g of bis(1-methoxy-hexamethyltrisiloxane-6-dimethylsilyl)octane and 300 g of toluene. Via an addition funnel, 203 g of water with 7 drops of HCl 33% are added over 1 hour at room temperature. After 24 hours, GC analysis shows that there is no starting material in the organic phase. The organic phase and the aqueous phase are separated and the organic phase is concentrated under vacuum to obtain 130 g of a silanol terminated poly{bis(octamethyltetrasiloxanylproply)octane} (BCB) block copolymer with a viscosity of 380 cP at 25° C.

Example 37: 1-8-bis(1-chlorooctamethyltetrasiloxanylpropyl)polyethyleneoxide

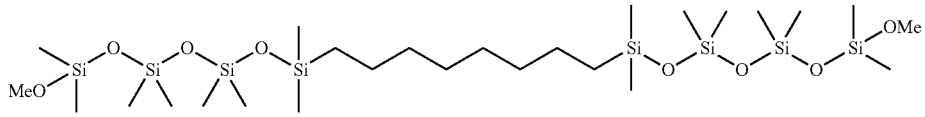 [SMILES: CO[Si](C)(C)O[Si](C)(C)O[Si](C)(C)O[Si](C)(C)CCCCCCCC[Si](C)(C)O[Si](C)(C)O[Si](C)(C)O[Si](C)(C)OC]

A 1-liter four neck glass reaction flask equipped with overhead stirring, reflux condenser, pot thermometer and addition funnel, is charged with 320 g 1-chloro-1,1,3,3,5,5,7,7-octamethyltetrasiloxane (98%, 0.98 mol) and is heated to 90° C. 0.5 g Karsted's catalyst solution 2 wt % Pt is added to the reaction flask and 201 g of polyethylene oxide diallyl ether (MW400) (0.50 k-mol) are added via the addition funnel at a rate to maintain the reaction temperature between 90 to 95° C. Once the addition of the solution is finished, the reactor contents are maintained at 90° C. for 60 minutes, time after which a sample is obtained for GC analysis to confirm that all the 1-chloro-1,1,3,3,5,5,7,7-octamethyl-tetrasiloxane has been consumed. The reactor is then equipped with a flash distillation apparatus and the reactor contents are stripped of lights under vacuum (<1 mm Hg) at 160° C. to obtain an isolated yield of 95%.

Example 38: Vinyldimethylsiloxy Terminated Silicon Block Copolymer ViDMSiO-A(BCB)$_n$A-OSiDMVi A 2-liter four neck glass reaction flask equipped with overhead stirring, Dean-Stark trap, reflux condenser, pot thermometer and addition funnel, is charged with 202 g of 1-8-bis(1-chlorooctamethyltetrasiloxanylpropyl) polyethylene oxide (Example 37) and 816 g of toluene and is heated to 50° C. Then 19 g of a 50 wt % solution of water in methanol is added to the reaction flask via the addition funnel. After two hours, the reactor contents are heated to reflux until methanol and water stop collecting in the Dean- Stark trap. At this point 60 g of divinydimethylchlorosilane are added to the reactor via the addition funnel followed by 20 g water. Reactor contents are heated and water is removed via the Dean-Stark apparatus. Reactor contents are subjected to a vacuum distillation to remove solvent obtaining 220 g of a vinyldimethylsiloxy terminated poly(octamethyltetrasiloxanylproply)polyethylene oxide (BCB) block copolymer.

Example 39: 3,3-bis(3-(7-methoxy-1,1,3,3,5,5,7,7-octamethyltetrasiloxanyl)-2-methylpropyl)-1$\lambda^4$,2$\lambda^4$, 3$\lambda^4$-trisulfa-1,2-diene-1-thione

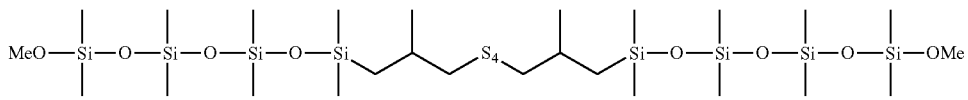

A 2-liter four neck glass reaction flask equipped with overhead stirring, reflux condenser, pot thermometer and addition funnel, is charged with 37.44 g sodium chloride, 25.74 g of sodium sulfide nonahydrate, 10.21 g sulfur, 109.38 g toluene and 512.38 g water. Under stirring, the pot content is heated to 84° C., and this temperature is kept for 90 minutes. After the first 40 minutes, the crude color changes to dark red, due to the formation of sulfur salts. Afterwards, 10 ml tetrabutylphosphonium chloride are added at once to the crude solution. 402 g toluene and 52 g 1-methoxy-1,1,3,3,5,5,7,7-octamethyl-7-(3-chlorobutyl)-tetrasiloxane are added dropwise through the addition funnel (total addition time 2 hours). The temperature is kept for 24 h until all the 1-methoxy-1,1,3,3,5,5,7,7-octamethyl-7-(3-chlorobutyl)-tetrasiloxane has reacted (followed by GC). Then the organic phase is separated from the aqueous phase, and washed three times with one-liter of water each time. The organic phase is then concentrated in a rotary evaporator under vacuum (<1 mm Hg) at a temperature of 35° C. The heavy residue is then analyzed by $^1$H NMR. The obtained product has a structure matching 3,3-bis(3-(7-methoxy-1,1,3,3,5,5,7,7-octamethyltetrasiloxanyl)-2-methylpropyl)-1$\lambda^4$, 2$\lambda^4$,3$\lambda^4$-trisulfa-1,2-diene-1-thione.

Example 40: Hydrophilic RTV Silicone formulation

On a glass plate, 4 g of the vinyl terminated polymer described in Example 38 are mixed with 4 g of poly(methylhydrosiloxane-dimethylsiloxane) copolymer 25 cSt. Then 3 drops Karsted's catalyst 2% are added and mixed with a spatula. The solution was then casted onto a glass slide; resulting in a hydrophilic elastomer film.

Example 41: Glass Surface Treatment

Microscope slides provided by VWR were immersed for 2 hours in a 10 wt % KOH, 70 wt % isopropanol 20 wt % water solution. Washed with methanol and sonicated for 5 minutes. Then immersed in a 2% HCl solution in water for 40 minutes. The plates were then washed with MeOH and dried in an oven at 110° C. for 24 hours. The slides were then coated by immersion during 3 minutes in different solutions, dried in air for 3 minutes, immersed for 5 seconds and dried again in air for 3 minutes, and finally washed with MeOH. This immersion sequence was repeated twice. Later, the plates were dried for 24 h in an oven at 110° C.

Contact angle measurements were made for these plates with water and ethylene glycol. The results reported in the Table 1 below indicate that the octamethyltetrasiloxanyl chain does not adversely affect the surface properties when compared to analogous silanes.

TABLE 1

Contact angle mesurements of glass treated slides

| Product | Concentration in toluene (wt %) | Contact angle water (°) | Contact angle ethylene glicol (°) |
|---|---|---|---|
| Octyldimethylchlorosilane | 10 | 97.84 | 78.98 |
|  | 5.0 | 94.52 | 73.77 |
|  | 2.5 | 95.83 | 72.35 |
| perfluorooctyldimethylchlorosilane | 10 | 94.65 | 82.24 |
|  | 5.0 | 97.10 | 79.22 |
|  | 2.5 | 95.22 | 79.92 |
| Octadecyldimethylchlorosilane | 10 | 99.35 | 79.29 |
|  | 5.0 | 101.54 | 78.38 |
|  | 2.5 | 96.43 | 79.16 |
| octyl hexamethyltrisiloxane DMCS (Example 2) | 10 | 96.66 | 74.82 |
|  | 5.0 | 98.99 | 76.78 |
|  | 2.5 | 96.94 | 73.12 |
| perfluorooctyl hexamethyltrisiloxane DMCS (Example 11) | 10 | 96.68 | 76.21 |
|  | 5.0 | 98.24 | 75.25 |
|  | 2.5 | 93.74 | 73.93 |
| Octadecyl hexamethyltrisiloxane DMCS (Example 4) | 10 | 95.58 | 69.63 |
|  | 5.0 | 94.24 | 65.69 |
|  | 2.5 | 94.24 | 65.69 |

Example 42: Preparation of Filled Silicone Elastomers

Preparation of Treated Fillers

AEROSIL® 200 fumed silica with a specific surface area of 200 m$^2$/g was surface-functionalized with 3-methacryloxypropyltrimethoxysilane, 1-methoxy-1,1,3,3,5,5-hexamethyl-5-(3-(oxiran-2-ylmethoxy)propyl)trisiloxane, and 1-chloro-1,1,3,3,5,5,7,7-octamethyl-1-(3-methacryloxypropyl)tetrasiloxane in an acidic methanol/cyclohexane solution. The boundary layer between the silica surface and the organofunctional group of 3-methacryloxypropyltrimethoxysilane is, according to published crystallographic data for siloxane bonds, 1.5 angstroms and 9-11 angstroms for 1-methoxy-1,1,3,3,5,5-hexamethyl-5-(3-(oxiran-2-ylmethoxy)propyl)trisiloxane, and 1-chloro-1,1,3,3,5,5,7,7- octamethyl-1-(3-methacryloxypropyl)tetrasiloxane. Thus, increasing the boundary layer between the silica surface and the organofunctional group (FIG. 1) by 600% to 733%. The silica once treated was vacuum dried to obtain a free-flowing powder.

Preparation of the Filled Elastomers

The fillers (1 wt % $SiO_2$ of the different functionalized AEROSIL® 200 fumed silicas) were dispersed into the bases poly(methacryloxypropyl)methylsiloxane and 7-9 mol % (methacryloxypropyl)methylsiloxane-dimethylsiloxane copolymer with vigorous mechanical stirring under vacuum until a homogeneous translucid fluid was obtained. Same procedure was applied using untreated AEROSIL® 200 fumed silica to be used as blank reference.

Figure 2:
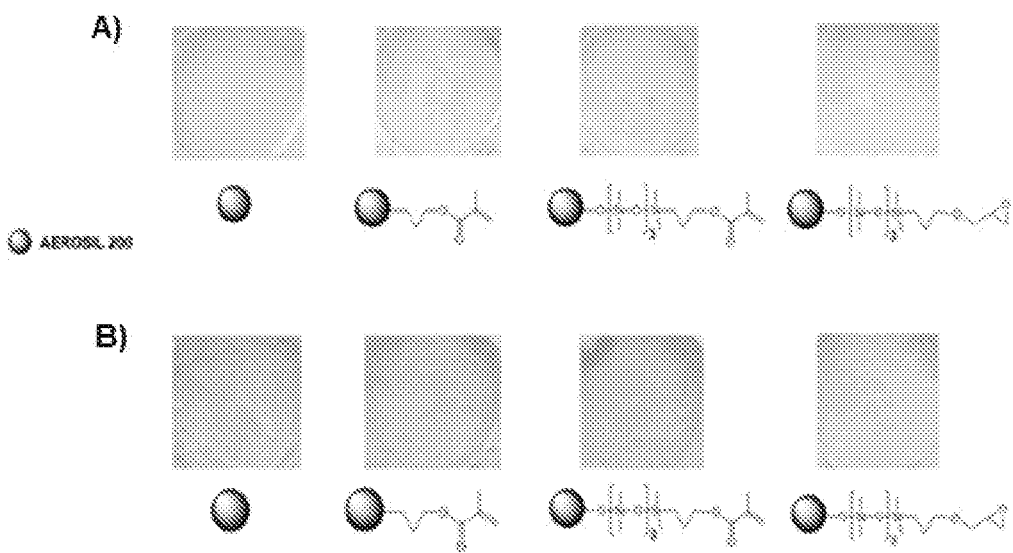
FIG. 2 shows filled silicone elastomers dispersed into the bases A) (methacryloxypropyl)methylsiloxane-dimethylsiloxane copolymer and B) poly(methacryloxypropyl)methylsiloxane. The physical appearance of the samples indicates that the octamethyltetrasiloxanyl chain did not adversely affect the optical properties of the filled silicone elastomers when compared to analogous fillers.

Subsequently, 1 wt % of 2-hydroxy-2-methylpropiophenone was added to every sample as the photo initiator. Then, 4 g of each silicone formulation were placed in aluminum foil molds and irradiated with a 365 nm UV light under an argon blanket. After 5 minutes the cured silicones were removed from the molds and rinsed with isopropanol. The physical appearance of the samples indicates that the octamethyltetrasiloxanyl chain did not adversely affect the optical properties of the filled silicone elastomers when compared to analogous fillers (FIG. 2), Example 43: Surface Treatment of Granite Stone The surface of twelve unpolished milled cut galician granite stone samples provided by Cemar17, S.L. of approximately 15 $cm^2$ with a thickness fo 0.5 cm were subjected to a three step surface treatment. Then treatment consisted of first applying a commercial silane coupling agent provided by Evonik Resource Efficiency Group GmbH, step 1 application method as described below, as an adhesion promoter; second, applying functionalized AEROSIL® 200 silica provided by Evonik Resource Effciency Group GmbH, step 2 applicatin method as described below; and a third surface treatment to provide hydrophobicity, step 3 application method described below.

Step 1: Application by brush of a 2 wt % solution of
  (1) 3-Aminopropyltrimethoxysilane in toluene and then allowed to dry at room temperature for approximately 10 minutes.

Step 2: Application by brush of a 1 wt % suspension of a functionalized AEROSIL® 200 and then allowed to dry at room temperature for 20 minutes. Three types of finctionalized AEROSIL® 200 fumed silica were applied:
  (A): 1 wt % suspension of AEROSIL® 200 surface-functionalized with 1-methoxy-1,1,3,3,5,5-hexamethyl-5-(3-(oxiran-2-ylmethoxy)propyl)trisiloxane
  (B): 1 wt % suspension of AEROSIL® 200 surface-functionalized 1-methoxy-1,1,3,3,5,5,7,7-octamethyl-7-(3-aminopropyl)tetrasiloxane
  (C): 1 wt % suspension of AEROSIL® 200 surface-functionalized with 3-Aminopropyltrimethoxysilane.

Step 3: Application by brush of a 2.5 wt % toluene solution of
  (1) perfluorooctyldimethylchlorosilane
  (2) 1-chloro-1,1,3,3,5,5,7,7-octamethyl-7-(3,3,4,4,5,5,6,6,7,7,8,8,8-tridecafluorooctyl)tetrasiloxane (Example 11)
  (3): 1-chloro-1,1,3,3,5,5,7,7-octamethyl-7-octadecyltetrasiloxane (Example 4)
  (4): 1-chloro-1,1,3,3,5,5,7,7-octamethyl-7-octyltetrasiloxane (Example 2)

The treated granite stone samples were kept at room temperature for 24 h sent to a laboratory for water contact angle and surface free energy measurements, data reported in Table 2 below. The 3-step treatment of the granite stone samples, except for 1-C-1 and 1-C-6, resulted in non-wettable superhydrophobic surfaces.

TABLE 2

Contact angle mesurements of granite stone samples

| Step1 | Step2 | Step3 | Contact angle water (°) | Surface free energy - Kwok-Neumann Model (mJ/$m^2$) | Surface free energy - Li-Neumann Model (mJ/$m^2$) |
|---|---|---|---|---|---|
| 1 | A | 1 | 143.64 | 2.94 | 2.38 |
| 1 | B | 1 | 151.08 | 1.34 | 1.02 |
| 1 | C | 1 | 90.08 | 28.75 | 29.19 |
| 1 | A | 2 | 148.12 | 1.89 | 1.47 |
| 1 | B | 2 | 146.31 | 2.28 | 1.81 |
| 1 | C | 2 | 147.69 | 1.98 | 1.55 |
| 1 | A | 3 | 145.12 | 2.58 | 2.06 |
| 1 | B | 3 | 140.99 | 3.69 | 3.05 |
| 1 | C | 3 | 143.43 | 3.00 | 2.43 |
| 1 | A | 4 | 13819 | 4.57 | 3.86 |
| 1 | B | 4 | 138.50 | 4.47 | 3.76 |
| 1 | C | 4 | 123.10 | 10.69 | 10.01 |

The invention claimed is:

1. A method for the treatment of fillers comprising:
1) applying a silane coupling agent and drying at room temperature;
2) applying a functionalized hydrophilic fumed silica with a specific surface area of 200 $m^2$/g and drying at room temperature;
3) applying an organofunctional siloxane selected from the group consisting of:
an organofunctional siloxane having the formula (V)

$$XR^1SiR_2(OSiR_2)_{n+1}OSiR_3 \quad (V)$$

wherein
X is selected from the group consisting of hydrogen, hydroxyl, aldehyde, acetate, amino, alkylimine, alkylamino, dialkylamino, diaminoalkyl, ureido, isocyanate, anhydride, epoxycyclohexyl, glycidoxy, mercapto, acryloxy, methacryloxy, methacrylamide, acrylamide, alkylamide, carboxylic acid, alkenyl, 2-hydroxy-3-(methacryloyloxy)propan-l-olate, alkyl, cycloalkyl, aryl, alkylaryl, arylalkyl, aryloxy, perfluoroalkyl, perfluoroaryl, alkylpolyalkylenoxy and hydroxypolyalkylenoxy;
R is selected from the group consisting of halogen, hydrogen, hydroxyl, alkyl, alkenyl, alkynyl, cycloalkyl, aryl, arylalkyl, alkylaryl and dialklyaryl, and alkoxy, acyloxy, alkyloyl, carbinoyl acyloxy group, alkylamine, dialkylamine, oximino and enoxy;
$R^1$ is selected from the group consisting of methyl, ethyl, propyl, butyl, isobutyl, phenyl and phenethyl; and
n is an integer having a value of 2 to 100,
an organofunctional siloxane having the formula (VII)

$$R_3SiO(R_2SiO)_nSiR_2R^2SiR_2(OSiR_2)_nOSiR_3 \quad (VII)$$

wherein
R is selected from the group consisting of hydrogen, hydroxyl, alkyl, alkenyl, alkynyl, cycloalkyl, aryl, arylalkyl, alkylaryl, dialklyaryl, alkoxy, acyloxy, alkyloyl, carbinoyl acyloxy group, alkylamine, dialkylamine, oximino and enoxy;
$R^2$ is selected from the group consisting of methyl, ethyl, propyl, butyl, isobutyl, phenyl and phenethyl; and n is an integer having a value of 2 to 100, and
an organofunctional siloxane having the formula (VIII)

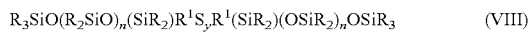
(VIII)

wherein
- R is selected from the group consisting of hydrogen, hydroxyl, alkyl, alkenyl, alkynyl, cycloalkyl, aryl, arylalkyl, alkylaryl, dialklyaryl, alkoxy, acyloxy, alkyloyl, carbinoyl acyloxy group, alkylamine, dialkylamine, oximino and enoxy;
- $R^1$ is selected from the group consisting of alkyl, cycloalkyl, aryl, arylalkyl, alkylaryl and dialklyaryl;
- n is an integer having a value of 2 to 100; and
- y is an integer having a value of 1 to 100,
- wherein the fillers are quartz, silica, glass, aluminium, clays, silicon, copper, tin, talc, inorganic oxides, steel, asbestos, nickel, zinc, lead, marble, gypsum, graphite or carbon.

* * * * *